F. W. HENRICSON.
TORCH.
APPLICATION FILED APR. 16, 1917.
1,255,745.
Patented Feb. 5, 1918.
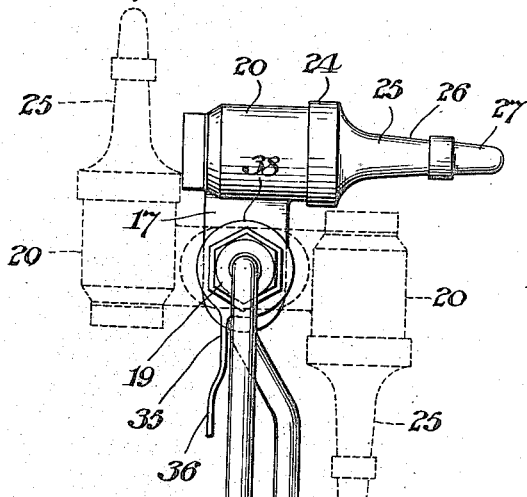
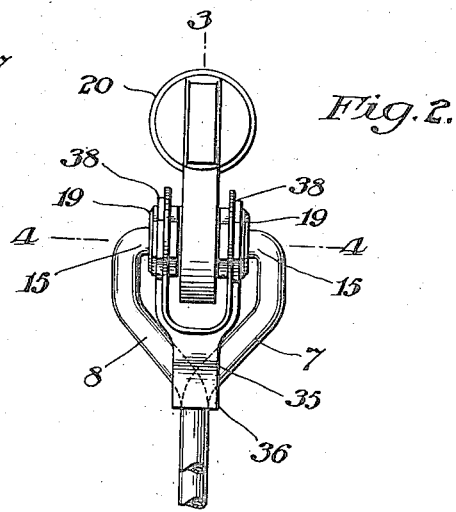
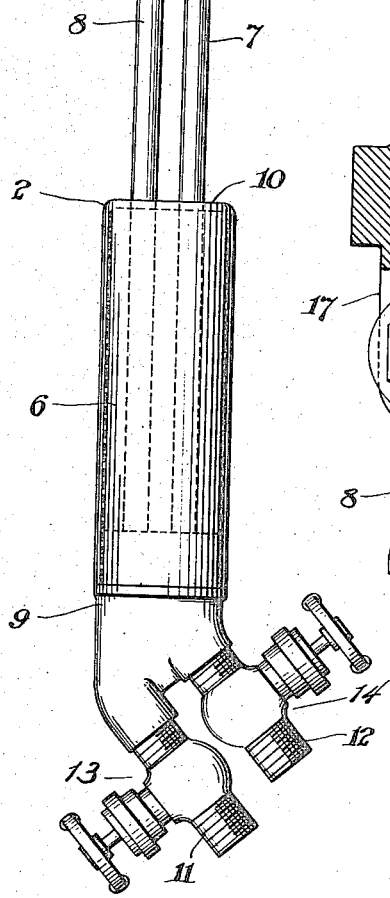
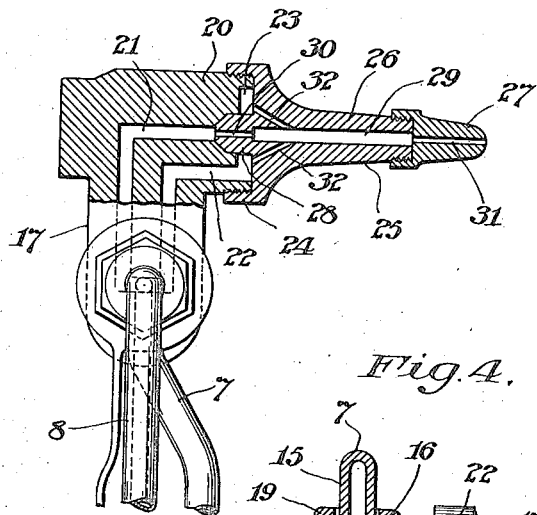
Inventor:
Fred W. Henricson,
By A. V. Toms
Attorney.

UNITED STATES PATENT OFFICE.

FRED W. HENRICSON, OF PHILADELPHIA, PENNSYLVANIA.

TORCH.

1,255,745.  Specification of Letters Patent.  Patented Feb. 5, 1918.

Application filed April 16, 1917. Serial No. 162,293.

*To all whom it may concern:*

Be it known that I, FRED W. HENRICSON, a citizen of the United States, residing at Philadelphia, in the county of Philadelphia and State of Pennsylvania, have invented certain new and useful Improvements in Torches, of which the following is a specification.

My invention relates to improvements in torches adapted to burn oxygen and acetylene gases for the purpose of fusing metal for welding, brazing, cutting, etc. The objects of my invention are, first, to provide a torch of novel construction which shall permit the nozzle to be adjusted into more advantageous positions relatively to the handle than heretofore, secondly, to provide a new and useful nozzle and nozzle holder, thirdly, to provide a novel means to hold the clamping nuts of the nozzle holder in place when the holder is in different positions of adjustment, and, fourthly, to provide a torch structure of novel, simple and efficient construction whereby various advantages are gained.

With these objects in view, my invented torch consists of the elements and combinations of them hereinafter described and claimed.

In the accompanying drawings, illustrating my invention:

Figure 1 is a side elevation of a torch embodying my invention.

Fig. 2 is a view of the nozzle, nozzle holder and adjuncts, as seen at right angles to Fig. 1.

Figs. 3 and 4 are sections, on lines 3—3 and 4—4 of Fig. 2, respectively, Fig. 4 omitting the wrench.

Referring to the drawings, the handle 2 of the torch comprises a cylindrical body 6 and pipes 7 and 8 located within the body 6 and extending beyond one end thereof. The inner ends of the pipes 7 and 8 are connected to a head 9 which is secured to one end of the body 6 and the pipes 7 and 8 are fitted to openings in a head 10 which is formed on the other end of the body 6 so that the body 6 and pipes 7 and 8 are held rigidly together and form the handle 2 of the torch.

The head 9 is provided with projecting nipples 11 and 12 which communicate with the pipes 7 and 8 and to which flexible supply pipes may be connected to supply oxygen and acetylene gases under pressure to the pipes 7 and 8, respectively. The nipples 11 and 12 are provided with suitable valves 13 and 14, respectively, by the manipulation of which the supply of the gases to the pipes 7 and 8 may be regulated.

The pipes 7 and 8 are suitably spaced from each other and they are provided with inturned ends 15 which project toward and in alinement with each other and which have half-round heads 16 on the inner ends thereof which face each other.

The nozzle holder 17 is located between the heads 16 on the pipes 7 and 8, and the heads 16 are fitted to ground sockets in the outer ends of hollow bosses 18 which project from the respective sides of the nozzle holder 17. The bosses 18 are exteriorly screw-threaded, and, screwed on to the bosses 18, are clamping nuts 19 having inturned flanges on their outer ends which engage the outer faces of the heads 16 and force them firmly against their sockets in the bosses 18 when the nuts 19 are screwed inwardly, thereby firmly clamping the pipes 7 and 8 and the nozzle holder 17 together. From the construction just described, it will be seen that the member 17 is pivoted to the pipes 7 and 8 of the handle member 2 on the axis of the ends 15 of the pipes 7 and 8, that by loosening the clamping nuts 19 the nozzle holder 17 may be adjusted on its pivot to different angular positions with respect to the pipes 7 and 8 or handle 2, as shown by dotted lines in Fig. 1, and that by tightening the clamping nuts 19 after any particular adjustment, the member 17 may be firmly held in its adjusted position.

The nozzle holder 17 extends from its pivot substantially at right angles to the axis thereof and has a projection 20 which extends from the body of the holder 17 substantially at right-angles thereto, the axis of the projection 20 crossing the axis of the pivot of the holder 17 a suitable distance therefrom, as shown in the drawings.

The nozzle holder 17 has oxygen and acetylene passages 21 and 22, respectively, extending through the body 17 and projection 20 thereof, the oxygen passage 21 extending centrally through the projection 20 and the acetylene passage 22 extending through the projection 20 laterally of the passage 21 and opening into an enlarged space or cavity 23 formed in the outer end of the projection 20 and surrounding the outer end of the central passage 21. The inner ends of the passages 21 and 22 communicate with the pipes 7 and 8, respectively, as shown.

The outer end of the projection 20 is exteriorly screw-threaded for the reception of the interiorly threaded flange 24 of a nozzle 25 which is screwed on to the projection 20. The nozzle 25 comprises a body portion 26 and a tip 27 screwed on to the outer end thereof, the body portion 26 having the flange 24 formed on the inner end thereof. There is also formed on the inner end of the body portion 26 a central projection 28 which penetrates the space or cavity 23 in spaced relation to the surrounding wall thereof and is fitted to a ground socket in the end of the projection 20, the projection 28 being forced against the socket in the projection 20, when the nozzle 26 is screwed on to the holder 17, to form a tight joint.

The body portion 26 of the nozzle 25 has a comparatively large central bore 29 extending between its projection 28 and its outer end, and its projection 28 has a central bore 30 of smaller diameter than the diameter of its large bore 29 and affording communication between the oxygen passage 21 and the large bore 29, and the tip 27 has a central bore 31 extending therethrough of smaller diameter than the diameter of the large bore 29, the bores 29, 30 and 31 constituting a continuous central passage which extends entirely through the nozzle 25.

The body portion 26 of the nozzle 25 is provided with two lateral passages 32 therein which afford communication between the respective sides of the large bore 29, thereby affording communication between the acetylene passage 22 in the holder 17 and the passage extending through the entire nozzle 25.

From the construction herein illustrated and described, it will be understood that when oxygen and acetylene gases are supplied to the torch through the pipes 7 and 8, respectively, the gases will unite within the passage in the nozzle 25 and issue from the free end of the tip 27 where they are burned in the usual manner. It will also be understood that the large bore 29 provides a mixing chamber of ample proportions for the thorough and proper mixing of the gases before they issue from the tip 27 for combustion. The large bore or chamber 29, in addition to insuring the proper mixing of the gases, maintains an ample supply of mixed gases at the burner tip 27 at all times and thereby prevents the well known and objectionable "flashback".

By constructing the nozzle holder 17 as shown and described and relating the parts thereof to its pivot and to the nozzle 25, I am enabled to adjust the nozzle 25 to many novel positions with respect to the handle 2, as shown by dotted lines in Fig. 1, for example, and also to direct the nozzle 25 back from the pivoted portion of its holder 17, parallel to the handle 2, and, even, if occasion should require, to point the nozzle 25 back and directly toward the axis of the handle 2, to thereby cause the flame of the torch to reach and be directed against parts which are difficult of access.

One of the clamping nuts 19 is provided with a left hand thread and the other is provided with a right hand thread so that when both nuts are turned together in one direction the nozzle holder 17 will be clamped firmly to the pipes 7 and 8 and that when both nuts 19 are turned in the reverse direction the nozzle holder will be unclamped to permit the adjustment thereof. To thus turn the clamping nuts 19 I provide a wrench member 35 comprising a handle 36 and spaced arms 38 which surround the nuts 19 and have openings therein which are fitted to the nuts, as shown. When the handle 36 is in the position shown in the drawings the nozzle holder 17 is clamped to the pipes 7 and 8, and when the handle 36 is moved outwardly from its normal position adjacent to the pipes 7 and 8 the holder 17 is released to permit the adjustment thereof, as previously explained. In assembling the parts, the arms 38 are sprung apart, after one nut 19 has been inserted into the opening in one arm 38, to permit the other nut 19 to be inserted into the opening in the other arm 38.

I claim:

1. In a torch, a nozzle holder having a central gas passage and a lateral gas passage opening into a space which surrounds the central passage, and a nozzle screwed on to said holder and closing said space and having an integral central projection penetrating said space in spaced relation to the surrounding wall of the holder and fitted to said holder around the central opening therein, said nozzle having a central passage therein communicating with the central passage of the holder, and said nozzle having a lateral passage therein affording communication between said space and the central passage of the nozzle.

2. In a torch, a nozzle holder having a central gas passage and a lateral gas passage therein, and a nozzle comprising a body portion screwed on to said holder and a tip screwed on to said body portion, the outer portion of said body portion having a large bore therein forming a gas mixing chamber, the inner portion of said body portion having a bore therein of smaller diameter than the diameter of said large bore and affording communication between said central passage and said large bore, said tip having a bore therein of smaller diameter than the diameter of said large bore and commuicating therewith, said bores constituting a passage extending through said nozzle, and the passage of said nozzle being in communication with the lateral passage in the holder.

3. In a torch, a nozzle holder having a central gas passage and a lateral gas passage opening into a space which surrounds the central passage, and a nozzle comprising a body portion screwed on to said holder and a tip screwed on to said body portion, said body portion having an integral central projection formed thereon and penetrating said space in spaced relation to the surrounding wall of the holder and fitted to said holder around the central opening therein, said body portion having a large bore therein forming a gas mixing chamber, said projection having a bore therein of smaller diameter than the diameter of said large bore and affording communication between said central passage and said large bore, said tip having a bore therein of smaller diameter than the diameter of said large bore and communicating therewith, said bores constituting a passage extending through said nozzle, and said body portion having a lateral passage therein affording communication between said space and said large bore.

4. In a torch, a handle member, a nozzle holder pivoted to the handle member, two nuts having parts coöperating with parts of said member and parts of said holder to clamp them together, one nut having a right hand thread and the other nut having a left hand thread, said nuts effecting the clamping action when turned in the same direction, and means operative to simultaneously turn said nuts.

5. In a torch, a handle member, a nozzle holder pivoted to the handle member, two nuts having parts coöperating with parts of said member and parts of said holder to clamp them together, one nut having a right hand thread and the other nut having a left hand thread, said nuts effecting the clamping action when turned in the same direction, and a wrench member comprising a handle and two arms embracing said nuts and operative to simultaneously turn said nuts.

In testimony whereof I affix my signature hereto.

FRED W. HENRICSON.